US012676413B2

(12) United States Patent
Kim et al.

(10) Patent No.: US 12,676,413 B2
(45) Date of Patent: Jul. 7, 2026

(54) APPARATUS AND METHOD FOR MEASURING STRENGTH OF SIGNAL

(71) Applicant: SAMSUNG ELECTRONICS CO., LTD., Suwon-si (KR)

(72) Inventors: Kihyun Kim, Suwon-si (KR); Seokhyeon Kim, Suwon-si (KR); Yonghoon Kim, Suwon-si (KR); Hyunchul Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 452 days.

(21) Appl. No.: 18/202,163

(22) Filed: May 25, 2023

(65) Prior Publication Data

US 2023/0299480 A1 Sep. 21, 2023

Related U.S. Application Data

(63) Continuation of application No. PCT/KR2021/017651, filed on Nov. 26, 2021.

(30) Foreign Application Priority Data

Nov. 26, 2020 (KR) ........................ 10-2020-0161616

(51) Int. Cl.
*H01Q 3/44* (2006.01)
*H01Q 9/28* (2006.01)

(52) U.S. Cl.
CPC ............... *H01Q 3/443* (2013.01); *H01Q 9/28* (2013.01)

(58) Field of Classification Search
CPC ........................ G01R 29/0892; G01R 29/0878; G01R 21/06; H01Q 3/443; H01Q 9/28;
(Continued)

(56) References Cited

U.S. PATENT DOCUMENTS 7,576,626 B2 8/2009 Gorbachov
7,937,051 B2 5/2011 Vaisanen
(Continued)

FOREIGN PATENT DOCUMENTS

JP 2000-298745 A 10/2000
JP 2006-311485 A 11/2006
(Continued)

OTHER PUBLICATIONS

Kim, Seong, "Mobile Communication Terminal and Power Calculation Method for the Same", Nov. 10, 2005, Korean Patent Application No. KR 20050107711, pp. 1-19, Full Document English Translation. (Year: 2005).*
(Continued)

*Primary Examiner* — An H Do
(74) *Attorney, Agent, or Firm* — Sughrue Mion, PLLC

(57) ABSTRACT

In a $5^{th}$ generation (5G) or pre-5G communication system for supporting a high data transfer rate, a method of measuring a power of a signal in an electronic device may include obtaining, by at least one sensor, a first voltage of the signal at a first point between a power amplifier and a transmission line, obtaining, by the at least one sensor, a second voltage of the signal at a second point between the transmission line and an antenna, and calculating a power of the signal, based on the first voltage and the second voltage. A length of the transmission line may be based on a wavelength of the signal. The method and corresponding electronic device reduce an error between power to be calculated and power consumed in practice.

20 Claims, 10 Drawing Sheets

(58) Field of Classification Search
CPC .......... H03F 3/24; H03F 1/0288; H03F 3/189; H03F 2200/451
See application file for complete search history.

(56) References Cited

U.S. PATENT DOCUMENTS

| | | | |
|---|---|---|---|
| 8,045,643 | B1 | 10/2011 | Bal et al. |
| 8,198,938 | B2 | 6/2012 | Yu |
| 9,143,172 | B2 * | 9/2015 | See .......................... H03F 3/24 |
| 10,630,324 | B1 | 4/2020 | Summers et al. |
| 10,897,280 | B2 * | 1/2021 | Lee .......................... H04B 1/38 |
| 11,411,573 | B2 * | 8/2022 | Verma .................... G01R 19/25 |
| 2002/0094791 | A1 | 7/2002 | Pehlke et al. |
| 2004/0145416 | A1 | 7/2004 | Kwon et al. |
| 2005/0020218 | A1 | 1/2005 | Zelley |
| 2007/0298736 | A1 | 12/2007 | Fujioka et al. |
| 2009/0009260 | A1 | 1/2009 | Gorbachov |
| 2009/0305647 | A1 | 12/2009 | McKay et al. |
| 2014/0132344 | A1 | 5/2014 | Outaleb |
| 2015/0071335 | A1 | 3/2015 | Breslin et al. |
| 2015/0103953 | A1 | 4/2015 | Lee et al. |
| 2015/0116039 | A1 | 4/2015 | Ahmed et al. |
| 2020/0266777 | A1 | 8/2020 | Arfaei Malekzadeh et al. |

FOREIGN PATENT DOCUMENTS

| | | | |
|---|---|---|---|
| JP | 2008-35487 | A | 2/2008 |
| JP | 2014-230071 | A | 12/2014 |
| KR | 10-0680211 | B1 | 2/2007 |
| KR | 10-2014-0053089 | A | 5/2014 |
| KR | 10-2015-0042470 | A | 4/2015 |
| WO | 2019/132757 | A1 | 7/2019 |

OTHER PUBLICATIONS

English Translation from Korean Patent Application No. KR 20050107711 (Year: 2005).*

Communication dated Mar. 7, 2024, issued by the European Patent Office in European Application No. 21898680.0.

Communication issued Mar. 20, 2025 by the Korean Intellectual Property Office in Korean Patent Application No. 10-2020-0161616.

Qunaj et al., "An E-band Fully-Integrated True Power Detector in 28nm CMOS," 2019 IEEE Radio Frequency Integrated Circuits Symposium, RMo4A-4, pp. 191-194, 2019.

International Search Report dated Mar. 23, 2022, issued by the International Searching Authority in International Application No. PCT/KR2021/017651 (PCT/ISA/210).

Written Opinion dated Mar. 23, 2022, issued by the International Searching Authority in International Application No. PCT/KR2021/017651 (PCT/ISA/237).

* cited by examiner

APPARATUS AND METHOD FOR MEASURING STRENGTH OF SIGNAL

CROSS-REFERENCE TO RELATED APPLICATIONS

This application is a bypass continuation application of International Patent Application No. PCT/KR2021/017651, filed on Nov. 26, 2021, which is based on and claims priority to Korean Patent Application No. 10-2020-0161616, filed on Nov. 26, 2020 in the Korean Intellectual Property Office, the disclosures of each of which are incorporated by reference herein in their entireties.

BACKGROUND

1. Field

The disclosure relates, in general, to a wireless communication system, and in particular, to a method and apparatus for measuring strength of a signal in the wireless communication system.

2. Description of Related Art

To meet a demand on wireless data traffic which has been in an increasing trend after a 4th Generation (4G) communication system was commercialized, there is an ongoing effort to develop an improved 5th Generation (5G) communication system or a pre-5G communication system. For this reason, the 5G communication system or the pre-5G communication system is called a beyond 4G network communication system or a post Long Term Evolution (LTE) system.

To achieve a high data transfer rate, the 5G communication system is considered to be implemented in an ultra-high frequency band. To reduce a propagation path loss at the ultra-high frequency band and to increase a propagation delivery distance, beamforming, massive Multiple Input Multiple Output (MIMO), full dimensional MIMO (FD-MIMO), array antenna, analog beam-forming, and large scale antenna techniques are under discussion in the 5G communication system.

In addition, to improve a network of a system, techniques such as an evolved small cell, an advanced small cell, a cloud Radio Access Network (RAN), an ultra-dense network, Device to Device (D2D) communication, a wireless backhaul, a moving network, cooperative communication, Coordinated Multi-Points (CoMP), and reception interference cancellation, or the like are being developed in the 5G communication system.

In addition thereto, hybrid Frequency shift keying and Quadrature Amplitude Modulation (FQAM) and Sliding Window Superposition Coding (SWSC) as an Advanced Coding Modulation (ACM) technique and Filter Bank Multi Carrier (FBMC), Non Orthogonal Multiple Access (NOMA), and Sparse Code Multiple Access (SCMA), or the like as an advanced access technology are being developed in the 5G system.

A beamforming technique may be used when using a signal of a millimeter wave (mmWave) band in the wireless communication system. An electronic device performing beamforming may use a plurality of antenna elements, and a plurality of Radio Frequency (RF) chains as paths through which signals transmitted or received by the plurality of antenna elements pass. In this case, in order to use the plurality of antenna elements and the plurality of RF chains, it may be desirable for the electronic device to minimize power consumption.

SUMMARY

According to certain aspects of the disclosure, provided are a transmission line having a specific length which may be used to accurately measure power of a signal passing through the transmission line in a wireless communication system, and a structure capable of accurately measuring signal power by arranging a transmission line without having to use an additional device in the wireless communication system.

According to an aspect of the disclosure, a method of measuring power of a signal includes obtaining, by at least one sensor, a first voltage of a signal at a first point between a power amplifier and a transmission line; obtaining, by the at least one sensor, a second voltage of the signal at a second point between the transmission line and an antenna; and calculating a power of the signal, based on the first voltage and the second voltage. A length of the transmission line may be based on a wavelength of the signal.

According to another aspect of the disclosure, an electronic device of a wireless communication system includes a power amplifier, an antenna, a transmission line disposed between the power amplifier and the antenna, at least one sensor, and at least one processor electrically coupled to the at least one sensor. The at least one sensor may be configured to obtain a first voltage of a signal at a first point between the power amplifier and the transmission line, and obtain a second voltage of the signal at a second point between the transmission line and the antenna. The at least one processor may be configured to calculate a power of the signal, based on the first voltage and second voltage obtained by the at least one sensor. A length of the transmission line may be based on a wavelength of the signal.

According to another aspect of the disclosure, an electronic device of a wireless communication system includes a plurality of RF chains, a plurality of antennas respectively corresponding to the plurality of RF chains, a transmission line, at least one sensor, and at least one processor electrically coupled to the at least one sensor. At least one RF chain of the plurality of RF chains may include a power amplifier. The transmission line may be disposed between the power amplifier and at least one antenna, of the plurality of antennas, corresponding to the power amplifier. The at least one sensor may be configured to obtain a first voltage of a signal at a first point between the power amplifier and the transmission line, and obtain a second voltage of the signal at a second point between the at least one antenna and the transmission line. The at least one processor may be configured to calculate a power of the signal, based on the first voltage and second voltage obtained by the at least one sensor. A length of the transmission line may be based on a wavelength of the signal.

An apparatus and method according to various embodiments of the disclosure may measure voltages of a signal passing through a specific-length transmission line disposed between a power amplifier and an antenna, thereby accurately calculating power irrespective of a change in antenna impedance.

An apparatus and method according to various embodiments of the disclosure may use a specific power amplifier, thereby accurately calculating power without having to dispose an additional transmission line.

In addition thereto, advantages acquired in the disclosure are not limited to the aforementioned advantages, and other advantages not mentioned herein may be clearly understood by those skilled in the art to which the disclosure pertains from the following descriptions, or may be learned by practice of the presented embodiments.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
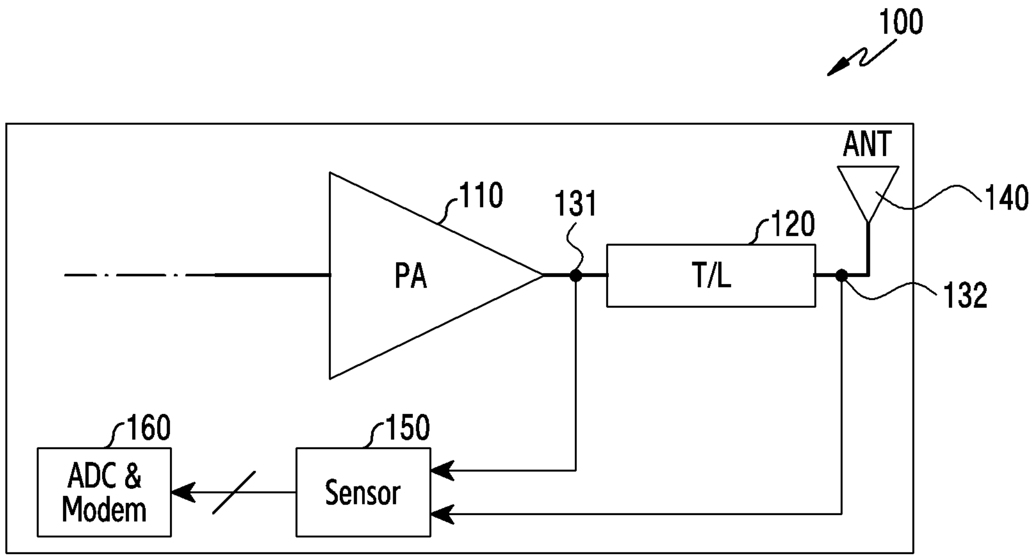
FIG. 1 illustrates an example of an electronic device according to an embodiment of the disclosure.

Terms used in the disclosure are for the purpose of describing particular embodiments only and are not intended to limit other embodiments. A singular expression may include a plural expression unless there is a contextually distinctive difference. All terms (including technical and scientific terms) used herein have the same meaning as commonly understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. The terms defined in the disclosure should not be interpreted to exclude clearly disclosed embodiments from the scope of the disclosure.

With regard to the description of the drawings, the same or similar reference numerals may be used to refer to the same or similar elements.

It will be recognized by those of skill that a real-world exact value is not practical to achieve in a real-world context. As such, when to specific values (such as a particular length or angle), or specific relationships between values (such as "equal" lengths or "orthogonal" angles) are disclosed herein, it will be understood that a margin of error is included in such disclosure. This margin of error may be signified by "substantially" or similar terms, but the absence of these terms should not be interpreted to mean that such margin of error is not disclosed.

A hardware-based approach is described for example in the various embodiments of the disclosure described hereinafter. However, since the various embodiments of the disclosure include a technique in which hardware and software are both used, a software-based approach is not excluded from the embodiments of the disclosure.

Hereinafter, terms used to refer to parts of an electronic device (e.g., a board structure, a substrate, a Printed Circuit Board (PCB), a Flexible PCB (FPCB), a module, an antenna, an antenna element, a circuit, a processor, a chip, a component, and a device), terms used to refer to a shape of the parts (e.g., a construction body, a construction object, a support portion, a contact portion, a protrusion, and an opening), terms used to refer to a connection portion between the construction bodies (e.g., a connection line, a feeding line, a connection portion, a contact portion, a support portion, a contact construction body, a conductive member, an assembly), terms used to refer to a circuitry (e.g., a PCB, an FPCB, a signal line, a feeding line, a data line, an RF signal line, an antenna line, an RF path, an RF module, and an RF circuit), and the like are exemplified for convenience of explanation. Therefore, the disclosure is not limited to terms described below, and thus other terms having the same technical meaning may also be used. In addition, the term '. . . unit', '. . . device', '. . . member', '. . . body', or the like may imply at least one configuration or may imply a unit of processing a function.

As noted briefly in the Background, it may be desirable for an electronic device having a plurality of RF chains to reduce power consumption, for both the reasons described in the Background and others. Accordingly, in order to measure power consumed by the signals transmitted or received by the plurality of antenna elements through the plurality of RF chains, it may be desirable to measure power consumption for each RF chain.

In an electronic device including a plurality of RF chains, a sensor disposed to an Integrated Circuit (IC) inside the RF chain may be used to measure power of a signal transmitted from an antenna. The power is calculated indirectly through a signal voltage measured through the sensor.

However, since the voltage and power of the signal have a constant relationship only when the antenna has constant impedance, the impedance of the antenna may be changed in practice due to an external factor (e.g., an arrangement of an adjacent circuit) or the like, and thus it may be inaccurate to measure the signal power by using only the signal voltage. Such a change in impedance of an antenna may change the voltage of the signal even if power consumed in the RF chain due to signal transmission or reception is identical.

Accordingly, in order to minimize an error of power measurement, a signal strength measurement may account for how the signal voltage changes depending on changes in the antenna impedance.

Hereinafter, the disclosure proposes a structure for accurately measuring power of a signal passing through an RF chain even in an environment in which impedance of an antenna changes. A transmission line having a specific length may be disposed between the antenna and a power amplifier disposed on the RF chain, and a sensor may obtain voltages of signals at a front end and a rear end of the transmission line having the specific length. Therefore, the electronic device may more accurately measure a power of the signal, based on the obtained voltages.

FIG. 1 illustrates an example of an electronic device according to an embodiment of the disclosure. Although the electronic device illustrated in FIG. 1 includes one power amplifier, one antenna, one transmission line coupling the power amplifier and the antenna, one sensor, and one Analog to Digital Converter (ADC) & Modulation and demodulation (Modem), this is for convenience of description, and the disclosure is not limited thereto. For example, in the electronic device, the power amplifier and the antenna may be coupled by a plurality of transmission lines. As another example, the electronic device may include a plurality of power amplifiers, as described below with reference to FIG. 2. As another example, a plurality of sensors may be coupled to the transmission line.

Referring to FIG. 1, an electronic device 100 may include a Power Amplifier (PA) 110, a Transmission Line (T/L) 120, an antenna 140, a sensor 150, an Analog to Digital Converter & Modulation and demodulation (ADC & Modem) 160. According to an embodiment, the PA 110 may be disposed on a plurality of RF chains in the electronic device 100 including the plurality of RF chains, as described below with reference to FIG. 8. According to an embodiment, the PA 110 may be disposed on at least one RF chain among the plurality of RF chains. For example, the PA 110 may be disposed on only one RF chain among the plurality of RF chains. As another example, the PA 110 may be disposed on only an adjacent subset of RF chains among the plurality of RF chains. As another example, the PA 110 may be disposed on only a non-adjacent subset of RF chains among the plurality of RF chains. As another example, the PA 110 may be disposed on all RF chains of the plurality of RF chains.

According to an embodiment, the PA 110 may be coupled to the transmission line 120. For example, the PA 110 may be coupled to one end of the transmission line 120 at any one portion referred to as a first connection portion 131. Although FIG. 1 depicts the PA 110 as coupled to only one transmission line 120, according to another embodiment, the PA 110 may be coupled to a plurality of transmission lines 120. For example, the PA 110 may be coupled to two or more transmission lines 120.

According to an embodiment, the PA 110 may be constructed of a plurality of power amplifiers. For example, as described below with reference to FIG. 2, the PA 110 may be constructed of a Doherty power amplifier including two power amplifiers.

According to an embodiment, one end of the transmission line 120 may be coupled to an output stage of the PA 110, and the other end of the transmission line 120 may be coupled to the antenna 140. According to an embodiment, any one portion of a connector between the transmission line 120 and the output stage of the PA 110 may be referred to as the first connection portion 131, and any one portion of a connector between the transmission line 120 and the antenna 140 may be referred to as a second connection portion 132. According to an embodiment, the transmission line 120 may be a path for transmitting to the antenna 140 a signal output from the output stage of the PA 110. In addition, according to an embodiment, the transmission line 120 may be included inside the PA 110. For example, as described below with reference to FIG. 2, the transmission line 120 may be a specific-length transmission line (e.g., a quarter wave transmission line) existing inside the Doherty power amplifier.

According to an embodiment, the length of the transmission line 120 may be associated with a wavelength of a signal output from the output stage of the PA 110. That is, the transmission line 120 may be provided having a length determined based on the wavelength. For example, when the wavelength of the signal output from the PA 110 is $\lambda$, the length of the transmission line 120 may be $\lambda/4$ or substantially $\lambda/4$. However, the disclosure is not limited thereto, and the length of the transmission line 120 may vary when configuring the electronic device 100. For example, the length of the transmission line 120 may be shorter than $\lambda/4$. As another example, the length of the transmission line 120 may be longer than $\lambda/4$. That is, when designing and configuring the electronic device 100, the length of the transmission line 120 may take into consideration a design restriction of an antenna and signal, or an influence of adjacent elements, among other variables.

According to another embodiment, the transmission line 120 may be constructed of a lumped circuit. This may also be described as the transmission line being replaced by an equivalent lumped circuit constructed to have impedance equivalent to that of the transmission line 120. For example, in order to construct the lumped circuit equivalent to the transmission line 120, the equivalent lumped circuit may be constructed by combining a capacitor and an inductor.

According to an embodiment, the antenna 140 may be constructed by at least one antenna element. For example, an electronic device 100 using a signal of a millimeter wave (mmWave) band may include a plurality of antenna elements to perform beamforming. In this case, one sub-array may be constructed by some antenna elements among the plurality of antenna elements. Although one antenna 140 is illustrated in FIG. 1 for convenience of description, the disclosure is not limited thereto, and the transmission line 120 may in another embodiment be coupled to a plurality of antenna elements through, for example, a node.

According to an embodiment, the sensor 150 may be electrically coupled at the first connection portion 131, which is a portion of a connector between the transmission line 120 and the PA 110. In addition, the sensor 150 may be electrically coupled at the second connection portion 132, which is a portion of a connector between the transmission line 120 and the antenna 140. According to an embodiment, the sensor 150 may measure a voltage value of a signal at each of the first connection portion 131 and the second connection portion 132. The sensor 150 may measure values of a first voltage and a second voltage.

For example, the first voltage may be a voltage of a signal to be transmitted at the first connection portion 131, and the second voltage may be a voltage at the second connection portion 132. In this case, the value of the first voltage and the value of the second voltage of the signal measured by the sensor 150 may each be a peak value of respective voltage.

According to another embodiment, a plurality of voltage values at the first connection portion 131 of the signal to be transmitted and a plurality of voltage values at the second connection portion 132 may be measured. For example, the first voltage may be a representative voltage value (e.g., an average value, a maximum value, etc.) obtained by measuring voltages at a plurality of points (e.g., three points) adjacent to the first connection portion 131. As another example, the first voltage may be a representative voltage value obtained by measuring a voltage at the first connection portion 131 during each of a plurality of specific periods.

Herein, the measuring of the voltage may be understood as obtaining a value of the voltage.

According to an embodiment, the sensor 150 may transmit the obtained signal voltage values to the ADC & Modem 160. More specifically, the sensor 150 may transmit voltage values obtained from the first connection portion 131 and the second connection portion 132 to the Modem by digitalizing signal voltage values obtained through the ADC.

According to an embodiment, the ADC & Modem 160 may calculate signal power by using the obtained signal voltage values. For example, a value obtained by digitalizing signal voltage values obtained through the sensor 150 may be transferred to the Modem through the ADC to convert (or calculate) the obtained signal voltage values into power. According to an embodiment, the ADC & Modem 160 may calculate power by using an average value of the obtained signal voltage values. For example, when a value of the first voltage is denoted by $V_1$ and a value of the second voltage is denoted by $V_2$, the ADC & Modem 160 may calculate power through $(V_1+V_2)/2$ which is an arithmetic average of the values of the first voltage and second voltage. As another example, the ADC & Modem 160 may calculate power through a geometric average (e.g., $\sqrt{V_1V_2}$) of the values of the first voltage and second voltage. According to another embodiment, the ADC & Modem 160 may calculate signal power, based on at least one of a maximum value, a median value, and a weight for a specific value of the first voltage and second voltage values. For example, when a first weight for the first voltage is denoted by $w_1$ and a second weight for the second voltage is denoted by $w_2$, the ADC & Modem 160 may calculate power through a voltage $V=w_1V_1+w_2V_2$ (where $w_1+w_2=1$) depending on weights of the first voltage and second voltage values.

As described above, the electronic device 100 may be constructed to include the transmission line 120 between the PA 110 and the antenna 140, and the sensor 150 of the electronic device 100 may measure signal voltage values at the first connection portion 131 and the second connection portion 132. In addition, the ADC & Modem 160 may convert the signal voltage values obtained by the sensor 150 into an average value or the like to calculate power of a signal transmitted by the antenna 140.

Hereinafter, a structure of an electronic device using a Doherty power amplifier instead of the power amplifier and transmission line of FIG. 1 will be described with reference to FIG. 2.

Figure 2:
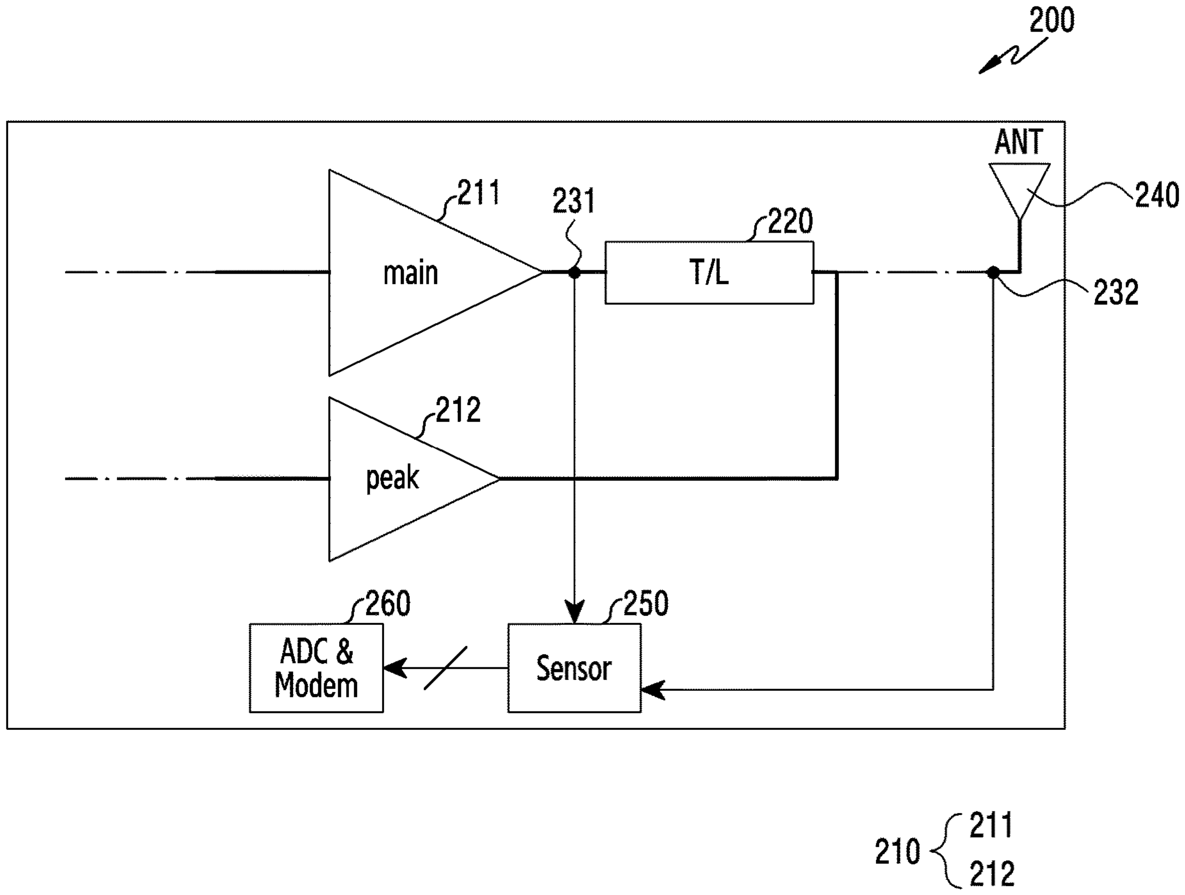
FIG. 2 illustrates an example of an electronic device including a Doherty power amplifier according to an embodiment of the disclosure.

FIG. 2 illustrates an example of an electronic device including a Doherty power amplifier according to an embodiment of the disclosure. Although an electronic device including one Doherty power amplifier, one antenna, one sensor, and one ADC & Modem is illustrated in FIG. 2 for convenience of description, the disclosure is not limited thereto. For example, the electronic device may include a plurality of antennas coupled by means of a single node, and the single node may be coupled to an output stage of the Doherty power amplifier. As another example, a plurality of sensors may be coupled to a transmission line.

Referring to FIG. 2, an electronic device 200 may include a Doherty power amplifier 210, an antenna 240, a sensor 250, and an ADC & Modem 260. According to an embodiment, the Doherty power amplifier 210 may be disposed on a plurality of RF chains in the electronic device 200 including the plurality of RF chains, as described below with reference to FIG. 8. According to another embodiment, the Doherty power amplifier 210 may be disposed on at least one RF chain among the plurality of RF chains. For example, the Doherty power amplifier 210 may be disposed on only one RF chain among the plurality of RF chains. As another example, the Doherty power amplifier 210 may be disposed on only an adjacent subset of RF chains among the plurality of RF chains. As another example, the PA 110 may be disposed on only a non-adjacent subset of RF chains among the plurality of RF chains. As another example, the Doherty power amplifier 210 may be disposed on all RF chains of the plurality of RF chains.

According to an embodiment, the Doherty power amplifier 210 may be coupled to one main power amplifier 211, one peak power amplifier 212, and at least one transmission line 220 coupling the main power amplifier 211 and the peak power amplifier 212. The transmission line 220 coupling the main power amplifier 211 and the peak power amplifier 212 is illustrated as one transmission line 220 in FIG. 2 only for convenience of description, and the disclosure is not limited thereto. For example, other transmission lines for signal distribution may also be disposed at respective input stages of the main power amplifier 211 and the peak power amplifier 212. In other words, the transmission line 220 of FIG. 2 illustrated as inside the Doherty power amplifier 210 does not exclude the possibility of one or more additional transmission lines disposed within the electronic device 200. Therefore, the transmission line 120 of FIG. 1 and the transmission line 220 of FIG. 2 may both be present in the same electronic device in certain embodiments, and need not carry or represent the same transmission signal.

According to an embodiment, one end of the transmission line 220 may be coupled to an output stage of the main power amplifier 211, and another end of the transmission line 220 may be coupled to the peak power amplifier 212 and the antenna 240. For example, any one portion between the transmission line 220 and the main power amplifier 211 may be referred to as a first connection portion 231. As another example, any one portion between the transmission line 220 and the peak power amplifier 212 or between the transmission line 220 and the antenna 240 may be referred to as a second connection portion 232. Although any one portion between the transmission line 220 and the antenna 240 is illustrated in FIG. 2 as the second connection portion 232, even if any one portion between the transmission line 220 and the peak power amplifier 212 serves as the second connection portion 232, it is electrically substantially the same node in practice and thus may be understood to be the same. According to an embodiment, the transmission line 220 may be disposed inside the Doherty power amplifier 210, which may be a path for transmitting signals output from an output stage of each power amplifier inside the Doherty power amplifier 210 to the antenna 240.

According to an embodiment, a length of the transmission line 220 may be associated with a wavelength of signals output from the output stages of the main power amplifier 211 and peak power amplifier 212 of the Doherty power amplifier 210. That is, the transmission line 220 may be provided having a length determined based on the wavelength. For example, when the wavelength of the signal output from the Doherty power amplifier 210 is denoted by k, the length of the transmission line 220 may be $\lambda/4$ or substantially $\lambda/4$.

According to an embodiment, the antenna 240 may include at least one antenna element. For example, the electronic device 200 using a signal of a mmWave band may include a plurality of antenna elements to perform beamforming. In this case, one sub-array may be constructed by a subset of the plurality of antenna elements. Although one antenna 240 is illustrated in FIG. 2 for convenience of description, the disclosure is not limited thereto, and the transmission line 220 may in another embodiment be coupled to a plurality of antenna elements through, for example, a node.

According to an embodiment, the sensor 250 may be electrically coupled at the first connection portion 231, which is a portion of a connector between the transmission line 220 and the main amplifier 211 of the Doherty power amplifier 210. In addition, the sensor 250 may be electrically coupled at the second connection portion 232, which is a portion of a connector between the transmission line 220 and the antenna 240 or between the transmission line 220 and the peak power amplifier 212. According to an embodiment, the sensor 250 may measure a voltage value of a signal at each of the first connection portion 231 and the second connection portion 232. The sensor 150 may measure values of a first voltage and a second voltage.

For example, the first voltage may be a voltage of a signal to be transmitted at the first connection portion 231, and the second voltage may be a voltage at the second connection portion 232. In this case, the value of the first voltage and the value of the second voltage of the signal measured by the sensor 250 may each be a peak value of the respective voltage.

According to another embodiment, a plurality of voltage values at the first connection portion 231 of the signal to be transmitted and a plurality of voltage values at the second connection portion 232 may be measured. For example, the first voltage may be a representative voltage value (e.g., an average value, a maximum value, etc.) obtained by measuring voltages at a plurality of points (e.g., three points) adjacent to the first connection portion 231. As another example, the first voltage may be a representative voltage value obtained by measuring a voltage at the first connection portion 231 during each of a plurality of specific periods.

Herein, the measuring of the voltage may be understood as obtaining a value of the voltage.

According to an embodiment, the sensor 250 may transmit the obtained signal voltage values to the ADC & Modem 260. More specifically, the sensor 250 may transmit voltage values obtained from the first connection portion 231 and the second connection portion 232 to the Modem by digitalizing signal voltage values obtained through the ADC.

According to an embodiment, the ADC & Modem 260 may calculate signal power by using the obtained signal voltage values. For example, a value obtained by digitalizing signal voltage values obtained through the sensor 250 may be transferred to the Modem through the ADC to convert (or calculate) the obtained signal voltage values into power. According to an embodiment, the ADC & Modem 260 may calculate power by using an average value of the obtained signal voltage values. For example, when a value of the first voltage is denoted by $V_1$ and a value of the second voltage is denoted by $V_2$, the ADC & Modem 260 may calculate power through $(V_1+V_2)/2$ which is an arithmetic average of the values of the first voltage and second voltage. As another example, the ADC & Modem 260 may calculate power through a geometric average (e.g., $\sqrt{V_1/V_2}$) of the values of the first voltage and second voltage. According to another embodiment, the ADC & Modem 260 may calculate signal power, based on at least one of a maximum value, a median value, and a weight for a specific value of the first voltage and second voltage values. For example, when a first weight for the first voltage is denoted by $w_1$ and a second weight for the second voltage is denoted by $w_2$, the ADC & Modem 260 may calculate power through a voltage $V=w_1V_1+w_2V_2$ (where $w_1+w_2=1$) depending on weights of the first voltage and second voltage values.

As described above, the electronic device 200 may be constructed to include the Doherty power amplifier 210 and the antenna 240, and the sensor 250 of the electronic device 200 may measure signal voltage values at the first connection portion 231 and the second connection portion 232. In addition, the ADC & Modem 260 may convert the signal voltage values obtained by the sensor 250 into an average value or the like to calculate power of a signal transmitted by the antenna 240.

A voltage of a signal has conventionally been measured at one point between a power amplifier and an antenna to calculate power of the signal, which may result in a change in impedance of the antenna. Accordingly, since a relationship between the voltage and the power is not necessarily constant, an error may occur when measuring the power of the signal. Therefore, a structure of being electrically coupled to the sensor to measure a voltage at front and rear ends of a transmission line having a specific length according to an embodiment of the disclosure (hereinafter, a sensing structure based on a quarter wave transmission line) may be used to calculate power through a representative value (e.g., an average value, a median value, a weight, a maximum value, etc.) of voltages obtained at the front and rear ends of the transmission line, thereby minimizing an error of power calculation. A process for this will be described in detail with reference to FIG. 3A to FIG. 7.

Although an example in which power is calculated based on an average value depending on an arithmetic average of voltages measured by a sensor is described hereinafter, the power may also be calculated based on a voltage value calculated by using a geometric average, a weight, or the like as described above.

Figure 3A:
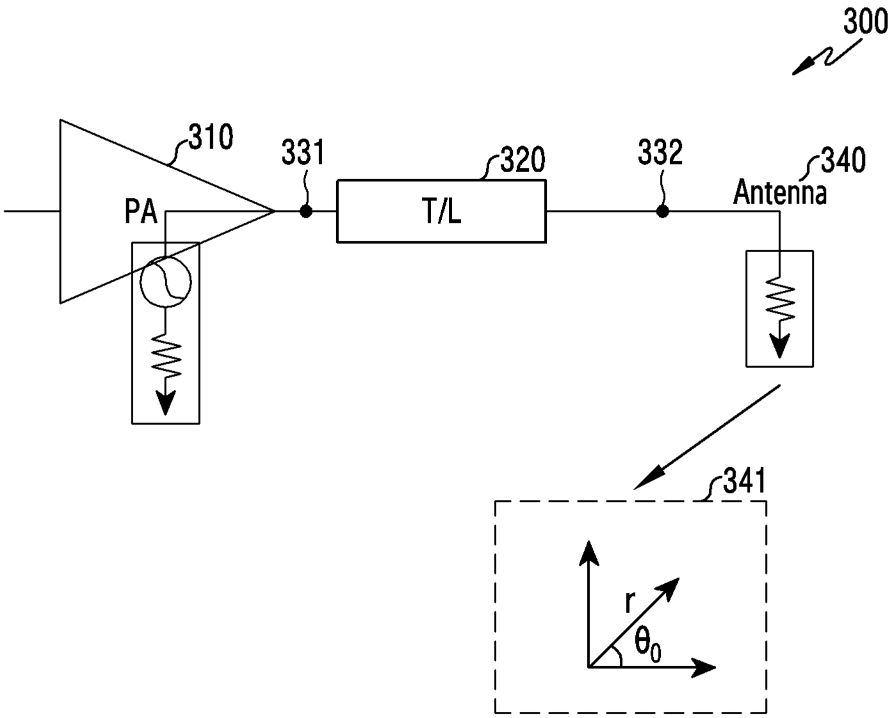
FIG. 3A is a circuit diagram illustrating an example of an electronic device according to an embodiment of the disclosure.
Figure 3B:
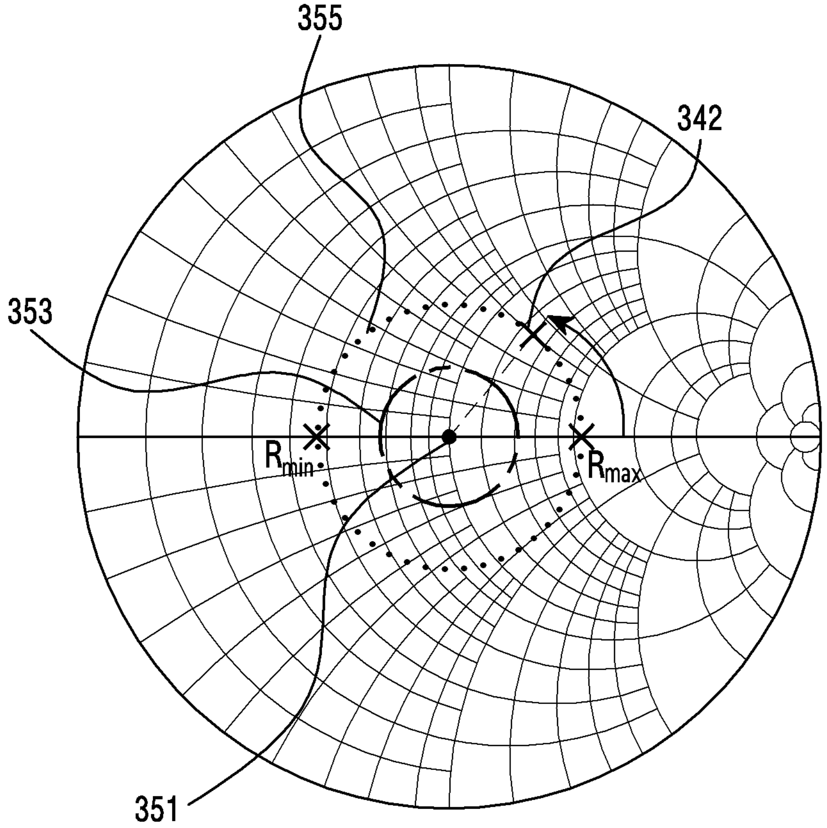
FIG. 3B is a smith chart representing an example impedance of an antenna according to an embodiment of the disclosure.

FIG. 3A is a circuit diagram illustrating an example of an electronic device according to an embodiment of the disclosure. FIG. 3B is a smith chart representing an example impedance of an antenna according to an embodiment of the disclosure. A circuit diagram of an electronic device 300 which is a simplification of the electronic device 100 of FIG. 1 is illustrated for convenience of description in FIG. 3A. Therefore, the electronic device 300 of FIG. 3A may be the electronic device 100 of FIG. 1. For example, the description of the PA 110 of FIG. 1 may be applied to a PA 310 of FIG. 3. However, FIG. 3A presents a simplified circuit diagram of the electronic device 100 of FIG. 1 only for convenience of description, and the electronic device 300 of FIG. 3A may instead be the electronic device 200 using the Doherty power amplifier 210 of FIG. 2, or another device within the scope of the disclosure.

Referring to FIG. 3A, the electronic device 300 may include the PA 310, a transmission line 320, and an antenna 340. The PA 310 may be replaced with equivalent impedance and power. In addition, the antenna 340 may be replaced with equivalent impedance. According to an embodiment, a first connection portion 331 may be any portion between the transmission line 320 and the PA 310, and a second connection portion 332 may be any portion between the transmission line 320 and the antenna 340. According to an embodiment, a sensor (not shown) may measure values of a first voltage and second voltage of respective signals at the first connection portion 331 and the second connection portion 332. The sensor may transmit the values of the first voltage and second voltage of the obtained signal to an ADC & Modem (not shown) of the electronic device 300, and thus the ADC & Modem may calculate signal power. For example, the signal power may be calculated as an average value of the first and second voltage values.

According to an embodiment, a length of the transmission line 320 may be associated with a wavelength of a signal passing through the transmission line 320. For example, when the signal wavelength is λ, the length of the transmission line 320 may be λ/4. For convenience of description, it is assumed hereinafter that the length of the transmission line 320 is signal wavelength/4 (λ/4).

According to an embodiment, impedance of the antenna 340 may be expressed in the form of a phasor. As shown in a diagram 341 of FIG. 3A, impedance of the antenna 340 may be defined by a function of r which denotes a magnitude of impedance and $\theta_0$ which denotes a phase of impedance. r may be expressed by a product of a Voltage Standing Wave Ratio (VSWR) and a reference resistor $R_0$. That is, r may be expressed as VSWR*$R_0$.

Hereinafter, for convenience of description, an example case will be assumed wherein a return loss of the impedance of the antenna 340 is about 10 dB, and a reference resistance $R_0$ is 50Ω. When the return loss of the impedance of the antenna 340 is about 10 dB, a VSWR may have a value of about 1.925 due to a relationship of the VSWR and the return loss. In addition, power transfer efficiency may be generally maximized when the impedance of the transmission line 320 is about 32Ω, and distortion of a signal waveform may be minimized when the impedance of the transmission line 320 is about 75Ω. Therefore, when the impedance of the transmission line 320 is about 50Ω, which is a median value, the transmission line 320 may be designed such that a signal waveform has high power transfer efficiency and low distortion. Accordingly, when a matching impedance of the antenna 340 is also about 50Ω, the antenna 340 may have high efficiency when radiating a signal. Therefore, the example case will assume that the reference resistance $R_0$ of the impedance of the antenna 340 is about 50Ω.

Referring to FIG. 3B, a first point 342 on the illustrated smith chart indicates antenna impedance, expressed by r and $\theta_0$. A second point 351 indicates a point at which a VSWR is 1 and a characteristic impedance is normalized to a reference resistance $R_0$ (50Ω). A first circle 353 indicates a set of points at which a VSWR is 1.5. A second circle 355 indicates a set of points at which a VSWR is 2. According to an embodiment, the first point 342 may change to a point in the range of $R_{max}$ and $R_{min}$, with a change in the impedance of the antenna 340. $R_{max}$ may be determined as VSWR*$R_0$, and $R_{min}$ may be determined as VSWR/$R_0$. For example, $R_0$ may indicate a reference resistance, and may be 50Ω. As such, $R_{max}$ may have a magnitude of about 10052, and $R_{min}$ may have a magnitude of about 25Ω. As illustrated in FIG. 3B, the impedance of the antenna 340 may change, and the first voltage of the first connection portion 331 and the second voltage of the second connection portion 332 of FIG. 3A may change depending on the change in the impedance of the antenna 340. Hereinafter, the change in the first voltage and second voltage depending on the change in the impedance will be described with reference to FIG. 3C.

Figure 3C:
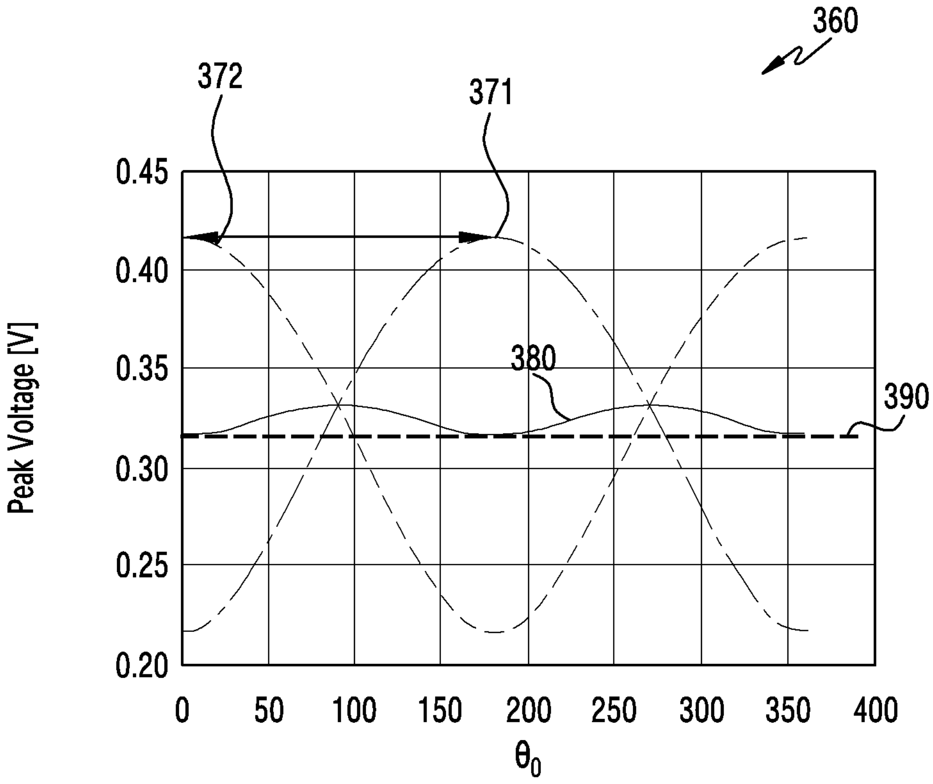
FIG. 3C is a graph illustrating an example of a voltage peak depending on an impedance change of an antenna according to an embodiment of the disclosure.

FIG. 3C is a graph illustrating an example of a voltage peak depending on an impedance change of an antenna according to an embodiment of the disclosure. A horizontal axis of a graph 360 of FIG. 3C indicates a phase (which may be measured in degrees: °) of the impedance of the antenna, and a vertical axis of the graph 360 indicates a voltage peak value (which may be measured in volts: V) of a signal obtained at a first connection portion and a second connection portion when a signal of 0 dBm is output from the power amplifier of FIG. 3A. In addition, for convenience of description, a self-loss of the transmission line 320 of FIG. 3A is excluded in the illustration.

Referring to FIG. 3C, the graph 360 shows a first line 371 indicating a voltage peak value of a first voltage obtained by the first connection portion 331 of FIG. 3A, a second line 372 indicating a voltage peak value of a second voltage obtained by the second connection portion 332 of FIG. 3B, a third line 380 indicating an average value of the voltage peak values of the first voltage and second voltage, and a fourth line 390 indicating a voltage peak value of a reference voltage $V_0$ at a reference resistance (e.g. about 50Ω).

Referring to the first line 371, the voltage peak value of the first voltage may change depending on a change in a phase of antenna impedance. For example, when the phase of antenna impedance is 0°, the voltage peak value of the first voltage may be about 0.22V. In addition, when the phase of antenna impedance is 180°, the voltage peak value of the first voltage may be about 0.42V. Referring to the second line 372, the voltage peak value of the second voltage may change depending on a change in a phase of antenna impedance. For example, when the phase of antenna impedance is 0°, the voltage peak value of the second voltage may be about 0.42V. In addition, when the phase of antenna impedance is 180°, the voltage peak value of the second voltage may be about 0.22V.

Referring to the first line 371 and the second line 372, the first line 371 may be constructed to have a phase difference of 180° or substantially 180° with respect to the second line 372. The first line 371 and the second line 372 may have the phase difference of 180° due to synthesis of a signal passing through the specific-length transmission line 320 of FIG. 3A (e.g., a quarter wave transmission line) and a reflected wave of the signal. In order to have the phase difference of 180° as described above, the phase difference between the first voltage and the second voltage may be 180° when the transmission line 320 has a length corresponding to one-fourth or substantially fourth of a wavelength of the signal passing through the transmission line 320. In terms of antenna impedance, when the phase difference between a point having a maximum voltage peak value and a point having a minimum voltage peak value is 180° in the first line 371 and the second line 372, respective antenna impedance values may be, for example, the $R_{max}$ and $R_{min}$ as illustrated in the smith chart of FIG. 3B and discussed therewith. For example, when the reference resistance $R_0$ is 50Ω, $R_{min}$ may be 25Ω and $R_{max}$ may be 100Ω.

The average value of the voltage peak values of the first voltage and second voltage, indicated by the third line 380, may be expressed by an equation of a reference voltage and a reflection coefficient as shown in <Equation 1> below.

$$V_{avg} = \frac{\sqrt{(1+|\Gamma|^2+2|\Gamma|\cos\Theta_0)} + \sqrt{(1+|\Gamma|^2-2|\Gamma|\cos\Theta_0)}}{2} V_0 \quad \text{[Equation 1]}$$

In Equation 1, $V_{avg}$ denotes an arithmetic average value of the first voltage and second voltage. Γ denotes a reflection coefficient of antenna impedance. $V_0$ denotes a reference voltage of a signal transmitted from an antenna when the antenna impedance is the reference resistance $R_0$ (e.g., 50Ω). $\theta_0$ denotes a phase of the antenna impedance.

Referring to the third line 380, the average value of the voltage peak values of the first voltage and second voltage may change depending on a change in a phase of antenna impedance. For example, when the phase of antenna impedance is 0°, the average value of the voltage peak values of the first voltage and second voltage may be about 0.3V. When the phase of antenna impedance is about 90°, the average value of the voltage peak values of the first voltage and second voltage may be about 0.32V. When the phase of antenna impedance is about 180°, the average value of the voltage peak values of the first voltage and second voltage may be about 0.3V. According to an embodiment, regarding the change in the voltage peak value depending on the change in the phase of antenna impedance, the third line 380 may be changed less in comparison to the first line 371 and the second line 372 with respect to the reference voltage indicated by fourth line 390. This may indicate that the voltage peak value of the average value of the first voltage and second voltage has a lower error than the respective voltage peak values of the first voltage and second voltage.

According to an embodiment, when the third line 380 is compared with the first line 371 and the second line 372, antenna impedance remains at a value of the reference resistance $R_0$ and thus an error with respect to the third line 380 which remains at a value of the reference voltage $V_0$ may be the lowest. For example, when the phase of antenna impedance is 0°, the third line 380 may coincide with the fourth line 390, and when the phase of antenna impedance is 180°, the third line 380 may coincide with the fourth line 390. That is, when the transmission line 320 has a length corresponding to one-fourth or substantially fourth of a wavelength of the signal passing through the transmission line 320 as shown in FIG. 3A, if power is calculated by using an average value of voltage values of a signal measured and obtained at a front end (e.g., a first connection portion) and rear end (e.g., a second connection portion) of the transmission line 320, a power measurement error may be lower than the other cases.

As described above, an error may occur when signal power is measured through a signal voltage obtained at one portion between the power amplifier and the antenna. For example, assuming that a reflection coefficient of the antenna impedance is about 10 dB, a VSWR may be about 1.925, and a voltage applied to an antenna stage may change up to about twice according to a definition of the VSWR. When this is converted into a decibel value, it may mean that the measured voltage may have an error of about 6 dB. In general, since a plurality of RF chains may be used in an electronic device using a signal of an mmWave band, a higher error may occur in the electronic device due to an error occurring in each RF chain. Therefore, in a sensing structure based on a quarter wave transmission line according to an embodiment of the disclosure, power may be calculated with a lower error than the conventional case, by calculating power based on an average value of voltage values of a front end (e.g., a first connection portion) and rear end (e.g., a second connection portion) of the transmission line (e.g., the quarter wave transmission line).

Hereinafter, an error between power calculated by an apparatus and method according to an embodiment of the disclosure and power for case where a reference voltage is applied to an antenna is described. In addition, calculating of power by using an average value (e.g., an arithmetic average) for a plurality of voltages measured by an apparatus and method according to an embodiment of the disclosure will be described in comparison with calculating of power by performing a multiplication operation on a plurality of voltages measured by an apparatus and method according to another embodiment of the disclosure.

Figure 4:
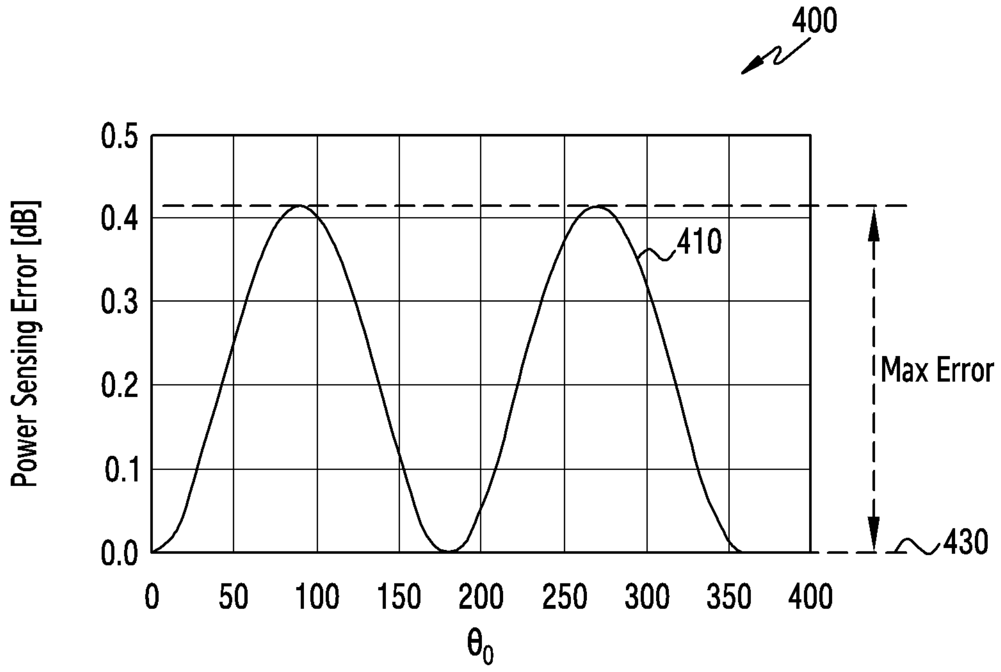
FIG. 4 is a graph illustrating an example of a power sensing error depending on an impedance change of an antenna according to an embodiment of the disclosure.

FIG. 4 is a graph illustrating an example of a power sensing error depending on an impedance change of an antenna according to an embodiment of the disclosure. A graph 400 illustrates an error of power based on a voltage peak value of the third line 380 of FIG. 3C in comparison with an error of power based on a voltage peak value of the third line 380. A horizontal axis of the graph 400 indicates a phase (which may be measured in degrees: °) of antenna impedance, and a vertical axis of the graph 400 indicates a power sensing error (which may be measured in decibels: dB). For convenience of description, it is assumed in the graph 400 that a VSWR is 1.925.

Referring to FIG. 4, the graph 400 shows a fifth line 410 indicating an error of power based on a voltage peak value of the third line 380 in the graph of FIG. 3C and a sixth line 430 indicating an error of power based on a voltage peak value of the fourth line 390 in the graph of FIG. 3C.

Referring to the fifth line 410, the power sensing error may change depending on a change in a signal phase. For example, when the phase of antenna impedance is 0°, a power sensing error value may be about 0 dB. When the phase of antenna impedance is 180°, the power sensing error value may be about 0 dB. In addition, when the phase of antenna impedance is 90°, the power sensing error value may be about 0.412 dB. In contrast, referring to the sixth line 430, the power sensing error may remain at 0 dB depending on a change in a signal phase. Since this power sensing error is determined with respect to a power of a signal having a reference voltage value applied to an antenna, the error value represented in the sixth line 430 may be effectively zero at all phases.

Comparing the fifth line 410 and the sixth line 430, a max error of the power sensing error value may be about 0.412 dB. A max error value of the fifth line 410 against the sixth line 430 may be defined by a VSWR or a reflection coefficient. This may be expressed by <equation 2> below.

$$\text{Max Error} = 10\log\left(1+|\Gamma|^2\right) = 10\log\left(1+\left|\frac{VSWR-1}{VSWR+1}\right|^2\right) \quad \text{[Equation 2]}$$

In Equation 2, Max Error denotes a max error of a power sensing error value. F denotes a reflection coefficient. VSWR denotes a voltage standing wave ratio of antenna impedance.

Referring to the aforementioned equation and graph 400, the max error value of the power sensing error value may change by the VSWR or the reflection coefficient. For example, the max error of the power sensing error value may decrease as the VSWR approaches 1. As another example, the max error of the power sensing error value may decrease as the reflection coefficient approaches 0.

Referring to FIG. 3 and FIG. 4, the power sensing error value may be calculated based on the voltage peak value of the signal, and the max power of the power sensing error value may be great when a difference between the voltage peak value and the reference voltage is great. In other words, the greater the difference between voltage peak value and the reference voltage, the higher the error that may occur in the process of sensing power. Therefore, power measurement using an apparatus and method according to an embodiment of the disclosure may have a lower error than power measurement using the conventional technique.

It has been described above that power is calculated through an average value (e.g., an arithmetic average) of voltage peak values of a front end (e.g., a first connection portion) and rear end (e.g., a second connection portion) of a transmission line with reference to FIG. 4, and the calculated power may be used to compare an error with respect to power, based on a reference voltage. Hereinafter, a power sensing error based on the average value of the voltage peak values of the front end and rear end of the transmission line will be described with reference to FIG. 5 in comparison with a power sensing error calculated by performing a multiplication operation on voltage peak values of the front end and rear end of the transmission line.

Figure 5:
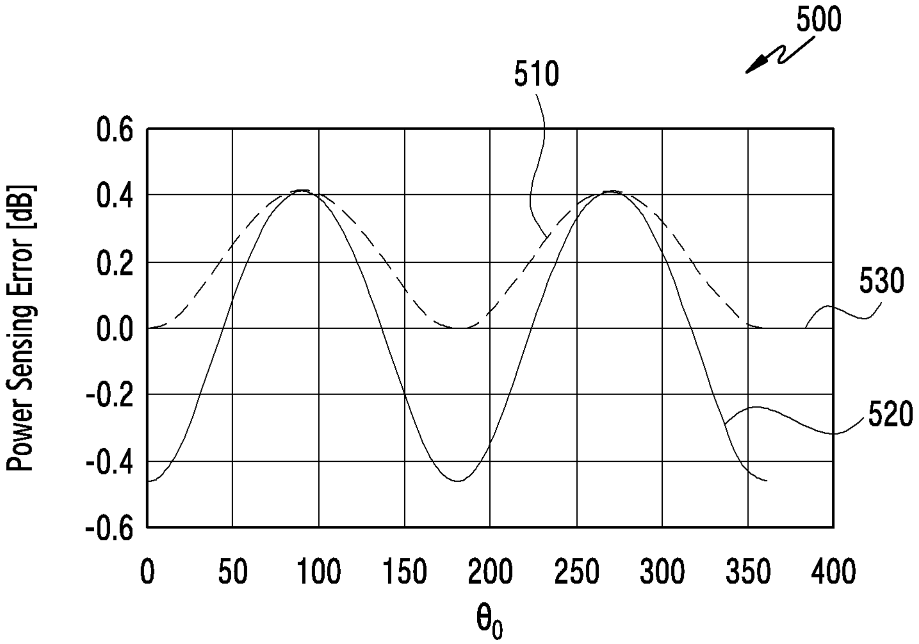
FIG. 5 is a graph illustrating another example of a power sensing error depending on an impedance change of an antenna according to an embodiment of the disclosure.

FIG. 5 is a graph illustrating another example of a power sensing error depending on an impedance change of an antenna according to an embodiment of the disclosure. A horizontal axis of a graph 500 indicates a phase (which may be measured in degrees: °) of antenna impedance, and a vertical axis of the graph 500 indicates a power sensing error (which may be measured in decibels: dB). For convenience of description, it is assumed in the graph 500 that a VSWR is 1.925.

Referring to FIG. 5, the graph 500 shows a seventh line 510 indicating an error of power based on the voltage peak value of the third line 380 in the graph of FIG. 3C, an eighth line 520 indicating an error of power calculated by multiplying the voltage peak values of the first line 371 and second line 372 in the graph of FIG. 3C, and a ninth line 530 indicating the error of power based on the voltage peak value of the fourth line 390 in the graph of FIG. 3C. The seventh line 510 of the graph 500 may be understood to indicate the same power sensing error as the fifth line 410 of the graph 400 of FIG. 4. In addition, the ninth line 530 of the graph 500 may be understood to indicate the same power sensing error as the sixth line 430 of the graph 400 of FIG. 4. In other words, the descriptions of the fifth line 410 and sixth line 430 of FIG. 4 may be equally applied to the seventh line 510 and ninth line 530 of FIG. 5.

Referring to the eighth line 520, a power sensing error may change depending on a change in a phase of antenna impedance. For example, when the phase of antenna impedance is 0°, a power sensing error value may be about −0.44 dB. When the phase of antenna impedance is 180°, the power sensing error value may be about −0.44 dB. In addition, when the phase of antenna impedance is about 90°, the power sensing error value may be about 0.412 dB.

Comparing the eighth line 520 and the ninth line 530, a max error of the power sensing error value may be about −0.44 dB. A max error value of the eighth line 520 against the ninth line 530 may be defined by a VSWR or a reflection coefficient. This may be expressed by <equation 3> below.

$$\text{Max Error} = 10\log\left(1 + \frac{1+|\Gamma|^2}{1-|\Gamma|^2}\right) \quad \text{[Equation 3]}$$

In Equation 3, Max Error denotes a max error of a power sensing error value. F denotes a reflection coefficient.

Referring to the aforementioned equation and graph 500, the max error value of the power sensing error value may change by the reflection coefficient. For example, the max error of the power sensing error value may decrease as the reflection coefficient approaches 0.

Comparing the seventh line 510 and the eighth line 520, when the phase of antenna impedance is about 90°, the power sensing error value is similar as about 0.412 dB, whereas when the phase of antenna impedance is about 0° or 180°, the power sensing error value may be different by about 0.44 dB. In addition, the seventh line 510 may have a small difference in a power sensing error with respect to the ninth line 530, whereas the eighth line 520 may have a greater difference in the power sensing error than the seventh line 510 with respect to the ninth line 530.

From this, it can be determined that a power sensing error value for a case where power is calculated by using an average value (e.g., an arithmetic average) obtained at a front end (e.g., a first connection portion) and rear end (e.g., a second connection portion) of a transmission line may have a lower error than a power sensing error value for a case where power is calculated by performing a multiplication operation on the obtained voltages, and power may be measured more accurately when power is calculated by using the average value.

Hereinafter, the conventional structure and a structure according to an embodiment of the disclosure are compared for description, and a relationship between power and voltage output from an antenna according to each structure is described.

Figure 6:
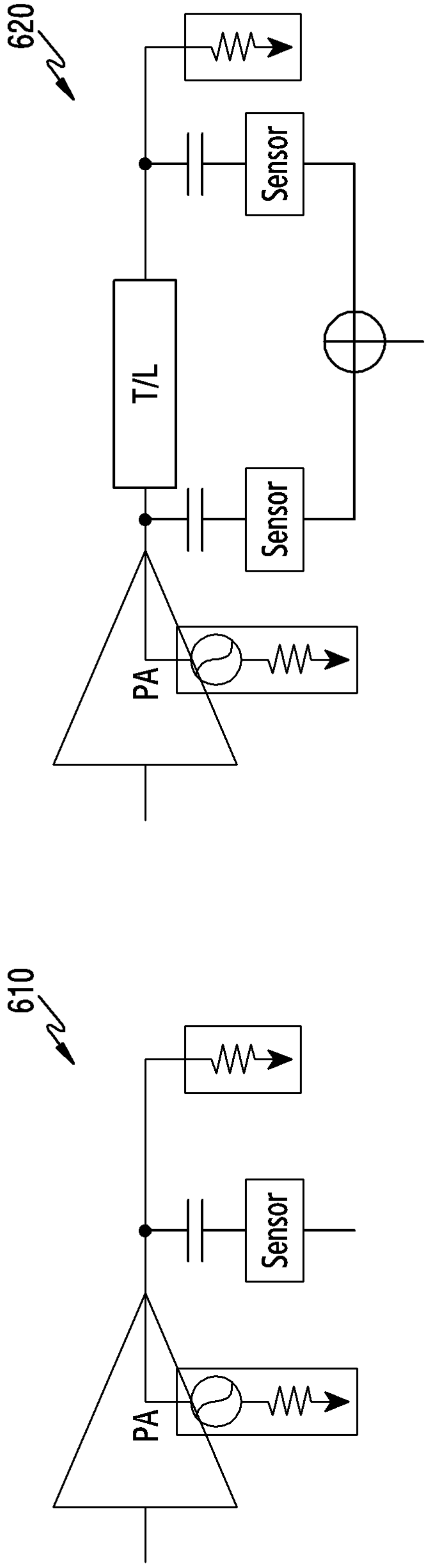
FIG. 6 is a circuit diagram illustrating examples of a structure of an electronic device according to an embodiment of the disclosure.

FIG. 6 is a circuit diagram illustrating examples of a structure of an electronic device according to an embodiment of the disclosure. An electronic device 610 of FIG. 6 has a structure for sensing a signal voltage at a single location, and an electronic device 620 has a structure for sensing a signal voltage at multiple locations, according to an embodiment of the disclosure.

Referring to FIG. 6, the electronic device 610 may include one Power Amplifier (PA) expressed as equivalent resistance and equivalent power, an antenna expressed as equivalent resistance, and a sensor subjected to coupling by a capacitor at one point between the PA and the antenna. In contrast, the electronic device 620 according to an embodiment of the disclosure may include one PA expressed as equivalent resistance and equivalent power, an antenna expressed as equivalent resistance, a specific-length transmission line connecting between the PA and the antenna, and two sensors. According to an embodiment, the two sensors of the electronic device 620 may sense a signal voltage respectively at one point between the PA and the transmission line and one point between the transmission line and the antenna. According to an embodiment, the two sensors of the electronic device 620 may calculate power by transferring voltage values obtained through sensing to an ADC & Modem (not shown). For example, the ADC & Modem may calculate power by using an average value (e.g., an arithmetic average, a geometric average) of obtained voltages. As another example, the ADC & Modem may calculate power by using a representative value (e.g., a weight for a maximum value, median value, and reference value) of the obtained voltages. The features and configuration of the electronic device 620 illustrated in FIG. 6 are for convenience of description, and an apparatus and method according to an embodiment of the disclosure are not limited thereto. For example, as described above in FIG. 2, the electronic device 620 may include a Doherty power amplifier constructed of a plurality of power amplifiers and a transmission line (e.g., a quarter wave transmission line). As another example, the electronic device 620 may include one or more sensors, and the one or more sensors may collectively sense a signal voltage at a front end and rear end of the transmission line.

Figure 7:
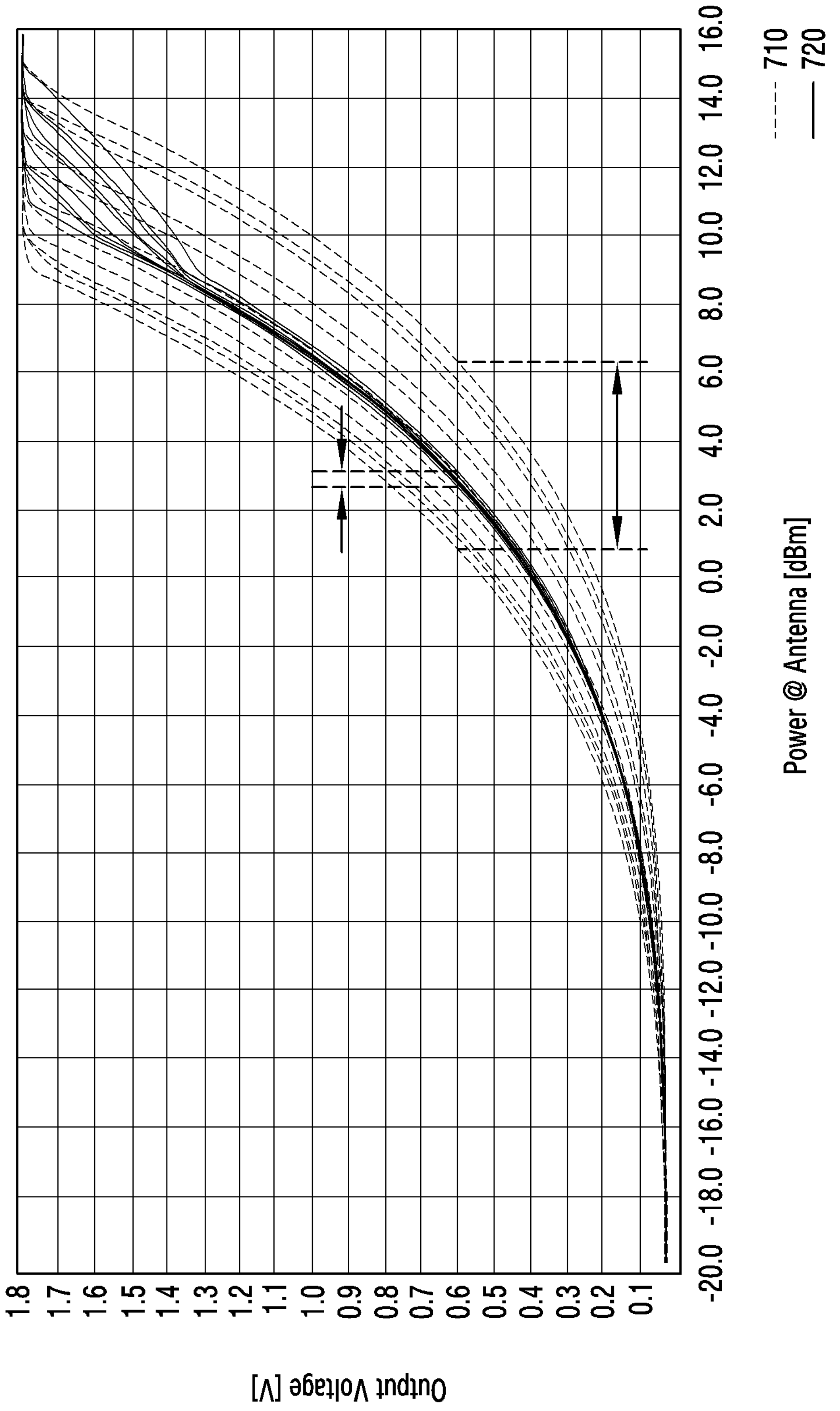
FIG. 7 is a graph illustrating examples of an output voltage depending on an output signal of an electronic device according to an embodiment of the disclosure.

FIG. 7 is a graph illustrating examples of a signal output voltage depending on an output signal of an electronic device according to an embodiment of the disclosure. A horizontal axis of the graph indicates power (which may be measured in decibel-milliwatts: dBm) output from an antenna, and a vertical axis of the graph indicates an output voltage (which may be measured in volts: V) of a signal obtained by a sensor. For convenience of description, it is assumed in FIG. 7 that a return loss is 10 dB.

Referring to FIG. 7, first lines 710 indicating an output voltage of a signal obtained according to power output from the antenna of the electronic device 610 of FIG. 6 and second lines 720 indicating an output voltage of a signal obtained according to power output from the antenna of the electronic device 620 of FIG. 6 are illustrated. According to an embodiment, the first lines 710 may indicate an output voltage obtained from a sensor according to output power, when a phase of antenna impedance changes by a specific value. For example, among the first lines 710, a line closest to a y-axis may indicate an output voltage when the antenna impedance is $R_{max}$. As another example, among the first lines 710, a line farthest from the y-axis may indicate an output voltage when the impedance of the antenna is $R_{min}$. According to an embodiment, the second lines 720 may indicate an output voltage which is an average value (e.g., an arithmetic average) of voltages obtained from a sensor according to output power, when the phase of antenna impedance changes by a specific value. For example, among the second lines 720, a line closets to the y-axis may indicate an output voltage when the antenna impedance is $R_{max}$. As another example, among the second lines 720, a line farthest from the y-axis may indicate an output voltage when the antenna impedance is $R_{min}$.

Referring to the first lines 710, when the output voltage is 0.6V, the output power of the antenna may be from about 1 dBm to about 6 dBm. That is, as the antenna impedance changes, power output from the antenna may be output differently with a great width even with the same output voltage. In contrast, referring to the second lines 720, the output power of the antenna may be about 3 dBm when the output voltage is 0.6V. That is, even if the antenna impedance changes, power output from the antenna may be almost the same when the output voltage is the same.

In summary, similarly to the first lines 710, when power is calculated through one output voltage obtained by a sensor, the output power may change depending on a change in antenna impedance even with the same output voltage. Unlike this, similarly to the second lines 720, when power is calculated through an output voltage which is an average value of output voltages obtained by the sensor, the output voltage and the output power may have a constant relationship. Accordingly, in a conventional structure, power consumed by an RF chain may have a high error with respect to power obtained by a sensor and calculated based on the voltage. However, in a structure according to an embodiment of the disclosure, the power consumed by the RF chain may have a low error with respect to power obtained by a sensor and calculated based on the voltage. For example, when a VSWR of antenna impedance of an electronic device is about 1.925 (i.e., when a return loss of the antenna impedance is about 10 dB), an error of power calculated using the conventional structure may be about 5.5 dB. However, an error of power calculated using an apparatus and method according to an embodiment of the disclosure may be about 0.412 dB.

Referring to FIG. 1 to FIG. 7, an apparatus and method for calculating power based on a voltage of a front end and rear end of a transmission line in a sensing structure based on a quarter wave transmission line according to an embodiment of the disclosure provide a more accurate measurement result than calculating of power based on a voltage at one point between the exiting power amplifier and an antenna. Since it is possible to minimize an error between power to be calculated and power to be output even if the antenna impedance changes, a method of calculating power based on the voltage of the front end and rear end of the transmission line may provide a more practical result compared to the existing method of calculating power based on the voltage only at one end.

In general, in a method of directly measuring power to be output, a size of an electronic device may be increased due to a measurement device disposed to the electronic device, and a loss may occur due to the measurement device itself. Therefore, power shall be measured indirectly through a voltage. However, since a voltage obtained by a sensor may change due to antenna impedance even with the same output, calculating of power by using one voltage may result in a high error with respect to power to be output in practice. Unlike this, since an apparatus and method according to an embodiment of the disclosure calculate power based on voltages of a front end and rear end of a transmission line by using a transmission line (e.g., a quarter wave transmission line) disposed between a power amplifier and an antenna or a transmission line existing inside a power amplifier (e.g., a Doherty power amplifier), an error with respect to power to be output in practice may be low despite a change in antenna impedance.

According to an embodiment, since a transmission line existing inside a power amplifier (e.g., a Doherty power amplifier) is used for the aforementioned power measurement, power consumption may be minimized. When power of the electronic device is measured directly, accuracy may be higher than a case where power is measured indirectly. However, it is inefficient since a size of the electronic device may be increased due to a device for performing direct measurement, and power may be consumed by the device. Unlike this, an apparatus and method for calculating power through the sensing structure based on the quarter wave transmission line according to an embodiment of the disclosure may secure accuracy similar to a method of directly measuring power, since power is calculated and a plurality of voltages are measured by using a transmission line inside a Doherty power amplifier. In addition, since a separate measurement device is not additionally required, it may also be efficient in terms of power consumption.

Since power is measured through the aforementioned structure, an apparatus and method according to an embodiment of the disclosure may provide a more efficient result than a case of using a signal of a mmWave band. For example, assuming that a return loss of an antenna is 10 dB as described above, an error of power calculated in one RF chain according to the conventional structure may be about 6 dB. In this case, if the signal of the mmWave band is used, a plurality of RF chains may be included in the electronic device. Accordingly, when the electronic device uses the signal of the mmWave band, an error between power to be calculated and power consumed in practice may be high. In order to minimize an influence used by the high error, the sensing structure based on the quarter wave transmission line according to an embodiment of the disclosure may be used.

An electronic device which transmits a signal of a mmWave band may make use of accurate power measurement for more efficient power distribution. In addition, the signal of the mmWave band may change sensitively due to various factors. In the electronic device which transmits the signal of the mmWave band, power calculation through a sensing structure based on a quarter wave transmission line may be predicted (calculated) similarly to power consumed in practice in the electronic device.

In other words, since a specific-length transmission line (e.g., a quarter wave transmission line) included in the plurality of RF chains is used, an error between power to be calculated and power consumed in practice may be low (e.g., about 0.412 dB). Accordingly, power distribution may be achieved efficiently.

According to an embodiment of the disclosure, a method of measuring power of a signal may include obtaining, by at least one sensor, a first voltage of the signal at a first point between a power amplifier and a transmission line, obtaining, by the at least one sensor, a second voltage of the signal at a second point between the transmission line and an antenna, and calculating power, based on the first voltage and the second voltage. A length of the transmission line may be associated with a wavelength of the signal.

In an embodiment, the length of the transmission line may be a quarter of the wavelength of the signal.

In an embodiment, the power amplifier may be a Doherty power amplifier. The transmission line may be a transmission line having a length which is a quarter of the wavelength of the signal existing inside the Doherty power amplifier.

In an embodiment, when a phase of the first voltage is a first phase and a phase of the second voltage is a second phase, a phase difference between the first phase and the second phase may be about 180°.

In an embodiment, the calculating of the power may be based on an average value of the first voltage and the second voltage.

In an embodiment, the average value may be an arithmetic average value of the first voltage and the second voltage.

In an embodiment, the calculating of the power may be based on at least one of a maximum value, median value, or weight of the first voltage and the second voltage.

An electronic device of a wireless communication system according to an embodiment of the disclosure described above may include a power amplifier, an antenna, a transmission line, at least one sensor, and at least one processor electrically coupled to the at least one sensor. The at least one sensor may be configured to obtain a first voltage of a signal at a first point between the power amplifier and the transmission line, and obtain a second voltage of the signal at a second point between the transmission line and the antenna. The at least one processor may be configured to calculate power, based on the first voltage and second voltage obtained by the at least one sensor. A length of the transmission line may be associated with a wavelength of the signal.

In an embodiment, the length of the transmission line may be a quarter of the wavelength of the signal.

In an embodiment, the power amplifier may be a Doherty power amplifier. The transmission line may be a transmission line having a length which is a quarter of the wavelength of the signal existing inside the Doherty power amplifier.

In an embodiment, when a voltage of the first point is a first voltage and a phase of the first voltage is a first phase, a second phase of a second voltage which is a voltage of the second point may have a phase difference of about 180° with respect to the first phase.

In an embodiment, the at least one processor may be configured to calculate the power, based on an average value of the first voltage and the second voltage.

In an embodiment, at least part of the support member is constructed of a metal material, and the average value may be an arithmetic average value of the first voltage and the second voltage.

In an embodiment, the at least one processor may be configured to calculate the power, based on at least one of a maximum value, median value, or weight of the first voltage and the second voltage.

An electronic device of a wireless communication system according to an embodiment of the disclosure described above may include a plurality of RF chains, a plurality of antennas corresponding to the plurality of RF chains, a transmission line, at least one sensor, and at least one processor electrically coupled to the at least one sensor. Among the plurality of RF chains, at least one RF chain may include a power amplifier. The at least one sensor may be configured to obtain a first voltage of a signal at a first point between the power amplifier and the transmission line, and obtain a second voltage of the signal at a second point between the at least one antenna among the plurality of antennas and the transmission line. The at least one processor may be configured to calculate power, based on the first voltage and second voltage obtained by the at least one sensor. A length of the transmission line may be associated with a wavelength of the signal.

In an embodiment, the length of the transmission line may be a quarter of the wavelength of the signal.

In an embodiment, the power amplifier may be a Doherty power amplifier. The transmission line may be a transmission line having a length which is a quarter of the wavelength of the signal existing inside the Doherty power amplifier.

In an embodiment, when a voltage of the first point is a first voltage and a phase of the first voltage is a first phase, a second phase of a second voltage which is a voltage of the second point may have a phase difference of about 180° with respect to the first phase.

In an embodiment, the at least one processor may be configured to calculate the power, based on an average value of the first voltage and the second voltage.

In an embodiment, the at least one processor may be configured to calculate the power, based on at least one of a maximum value, median value, or weight of the first voltage and the second voltage.

Figure 8:
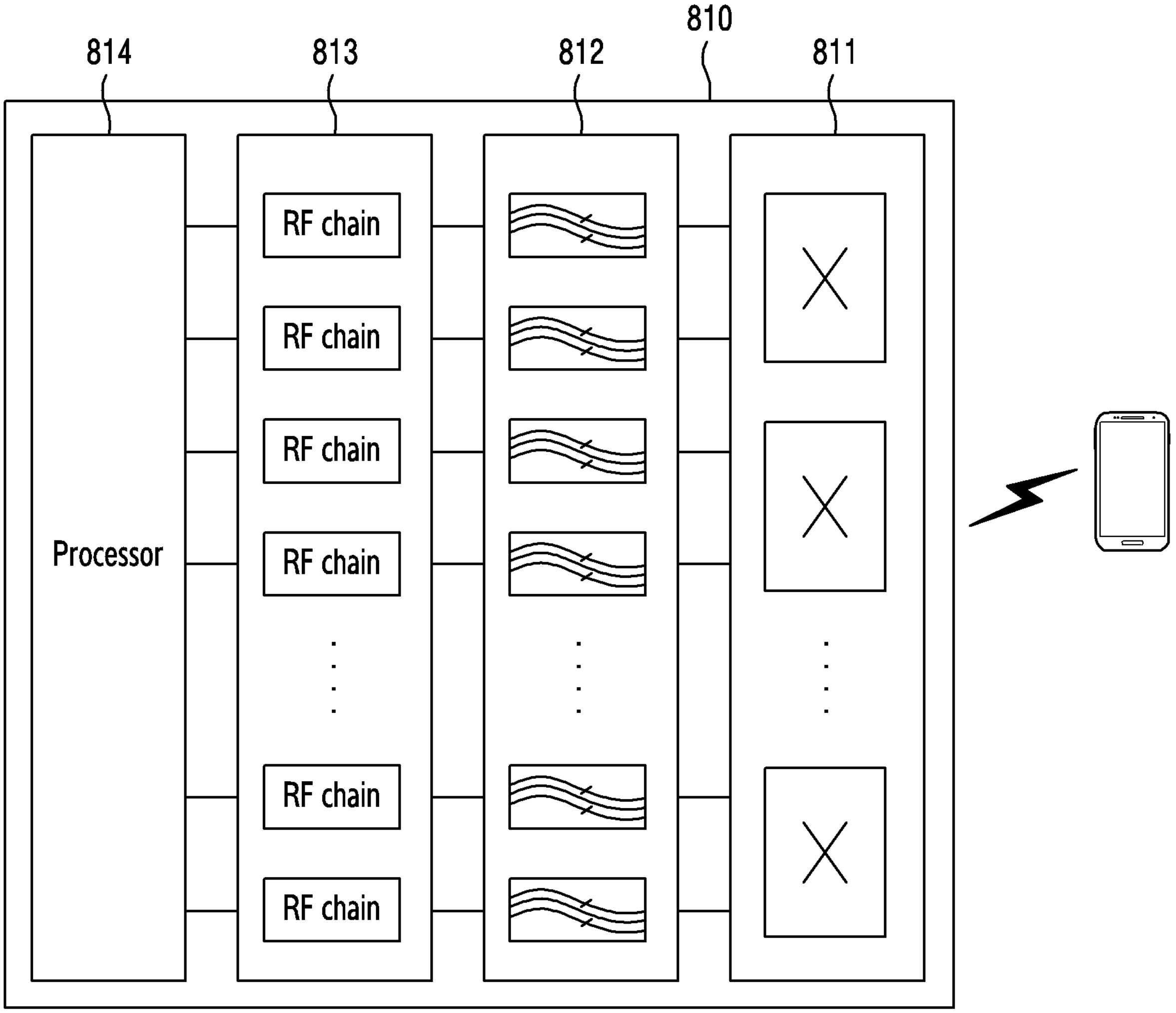
FIG. 8 illustrates a functional configuration of an electronic device according to various embodiments of the disclosure.

FIG. 8 illustrates a functional configuration of an electronic device according to various embodiments of the disclosure. An electronic device 810 may be the electronic device 100 of FIG. 1 or the electronic device 200 of FIG. 2. According to an embodiment, the electronic device 810 may be an electronic device using a signal of a mmWave band. In a structure mentioned with reference to FIG. 1 to FIG. 7 in which a specific-length transmission line (e.g., a quarter wave transmission line) is disposed between a power amplifier and antenna or in which a specific length-transmission line (e.g., a quarter wave transmission line) is included inside the power amplifier, not only a method and apparatus for calculating power based on voltages of a front end and rear end of the transmission line but also an electronic device including the apparatus and an electronic device using the method is included in embodiments of the disclosure.

Referring to FIG. 8, an exemplary functional configuration of the electronic device 810 is illustrated. The electronic device 810 may include an antenna unit 811, a filter unit 812, a Radio Frequency (RF) processing unit 813, and a control unit 814.

The antenna unit 811 may include a plurality of antennas. The antenna performs functions for transmitting and receiving signals through a radio channel. The antenna may include a radiator formed on a substrate (e.g., a PCB). The antenna may radiate an up-converted signal on the radio channel or obtain a signal radiated by another device. Each antenna may be referred to as an antenna element or an antenna device. In some embodiments, the antenna unit 811 may include an antenna array in which a plurality of antenna elements constitute an array. The antenna unit 811 may be electrically coupled to the filter unit 812 through RF signal lines. The antenna unit 811 may be mounted on a PCB including a plurality of antenna elements. The PCB may include a plurality of RF signal lines to couple each antenna element and a filter of the filter unit 812. The RF signal lines may be referred to as a feeding network. The antenna unit 811 may provide a received signal to the filter unit 812 or may radiate the signal provided from the filter unit 812 into the air. An antenna of the structure according to an embodiment of the disclosure may be included in the antenna unit 811.

According to various embodiments, the antenna unit 811 may include at least one antenna module having a dual-polarized antenna. The dual-polarized antenna may be, for example, a cross-pol (x-pol) antenna. The dual-polarized antenna may include two antenna elements corresponding to different polarizations. For example, the dual-polarized antenna may include a first antenna element having a polarization of +45° or substantially +45° and a second antenna element having a polarization of −45° or substantially −45°. The polarization may be alternatively formed of other polarizations orthogonal or substantially orthogonal to each other, in addition to +45° and −45°. Each antenna element may be coupled to a feeding line, and may be electrically coupled to the filter unit 812, the RF processing unit 813, and the control unit 814 to be described below.

According to an embodiment, the dual-polarized antenna may be a patch antenna (or a micro-strip antenna). Since the dual-polarized antenna has a form of a patch antenna, it may be easily implemented and integrated as an array antenna. Two signals having different polarizations may be input to respective antenna ports. Each antenna port corresponds to an antenna element. For high efficiency, it is desirable to optimize a relationship between a co-pol characteristic and a cross-pol characteristic between the two signals having the different polarizations. In the dual-polarized antenna, the co-pol characteristic indicates a characteristic for a specific polarization component and the cross-pol characteristic indicates a characteristic for a polarization component different from the specific polarization component.

The filter unit 812 may perform filtering to transmit a signal of a desired frequency. The filter unit 812 may perform a function for selectively identifying a frequency by forming a resonance. In some embodiments, the filter unit 812 may structurally form the resonance through a cavity including a dielectric. In addition, in some embodiments, the filter unit 812 may form a resonance through elements which form inductance or capacitance. In addition, in some embodiments, the filter unit 812 may include a Bulk Acoustic Wave (BAW) filter or a Surface Acoustic Wave (SAW) filter. The filter unit 812 may include at least one of a band pass filter, a low pass filter, a high pass filter, and a band reject filter. That is, the filter unit 812 may include RF circuits for obtaining a signal of a frequency band for transmission or a frequency band for reception. The filter unit 812 according to various embodiments may electrically couple the antenna unit 811 and the RF processing unit 813 to each other.

The RF processing unit 813 may include a plurality of RF paths. The RF path may be a unit of a path through which a signal received through an antenna or a signal radiated through the antenna passes. At least one RF path may be referred to as an RF chain. The RF chain may include a plurality of RF elements. The RF elements may include an amplifier, a mixer, an oscillator, a Digital-to-Analog Converter (DAC), an Analog-to-Digital Converter (ADC), or the like. For example, the RF processing unit 813 may include an up converter which up-converts a digital transmission signal of a baseband to a transmission frequency, and a DAC which converts the converted digital transmission signal into an analog RF transmission signal. The converter and the DAC constitute a transmission path in part. The transmission path may further include a Power Amplifier (PA) or a coupler (or a combiner). In addition, for example, the RF processing unit 813 may include an ADC which converts an analog RF reception signal into a digital reception signal and a down converter which converts the digital reception signal into a digital reception signal of a baseband. The ADC and the down converter may constitute a reception path in part. The reception path may further include a Low-Noise Amplifier (LNA) or a coupler (or a divider). RF parts of the RF processing unit may be implemented on a PCB. The antennas and the RF parts of the RF processing unit may be implemented on the PCB, and filters may be repeatedly fastened between one PCB and another PCB to constitute a plurality of layers.

A power amplifier and sensor having a structure according to an embodiment of the disclosure may be included in the RF processing unit 813 of FIG. 8. That is, the RF processing unit 813 may be understood as part of the RF chain of the disclosure. In addition, a specific-length transmission line having a structure according to an embodiment of the disclosure may exist inside a specific power amplifier (e.g., a Doherty power amplifier), and thus may be included in the RF processing unit 813. However, the disclosure is not limited thereto, and the specific-length transmission line may be disposed to a region which connects the RF processing unit 813 and the antenna unit 811. A length of the transmission line may be associated with a wavelength of a signal passing through the transmission line.

The control unit 814 may provide overall control to the electronic device 810. The control unit 814 may include various modules for performing communication. The control unit 814 may include at least one processor such as a modem. The control unit 814 may include modules for digital signal processing. For example, the control unit 814 may include a modem. In data transmission, the control unit 814 generates complex symbols by encoding and modulating a transmission bit-stream. In addition, for example, in data reception, the control unit 814 restores a reception bit-stream by demodulating and decoding a baseband signal. The control unit 814 may perform functions of a protocol stack employed in a communication standard.

An ADC & Modem having a structure according to an embodiment of the disclosure may be included in the control unit 814 of FIG. 8.

The functional configuration of the electronic device 810 is described in FIG. 8 as a device capable of utilizing an apparatus and method according to various embodiments. However, the example of FIG. 8 is only an exemplary configuration for utilizing the apparatus and method according to various embodiments of the disclosure described with reference to FIG. 1 to FIG. 7, and embodiments of the disclosure are not limited to components of the device of FIG. 8. Therefore, in an electronic device including a specific-length transmission line between a power amplifier and an antenna or including a specific-length transmission line inside the power amplifier, a method of measuring power based on voltages of a front end and rear end of the transmission line, an apparatus using the method, or an electronic device including the apparatus using the method may also be understood as an embodiment of the disclosure.

In addition, the disclosure is not limited to the structure illustrated in FIG. 1 to FIG. 7. For example, although power is calculated by using a representative value calculated based on the first voltage and the second voltage in FIG. 1 to FIG. 7 in the disclosure, the power may also be calculated based on a representative value of voltages measured in another portion (e.g., a third connection portion, a fourth connection portion, etc.). Accordingly, the electronic device may include a plurality of power amplifiers, a plurality of specific-length transmission lines, or a plurality of sensors.

The provision and execution of methods based on the embodiments disclosed herein may be implemented by hardware, software, or a combination of both.

When implemented in software, computer readable recording medium for storing one or more programs (i.e., software modules) may be provided. The one or more programs stored in the computer readable recording medium may be configured for execution performed by one or more processors in the electronic device. The one or more programs may include instructions for allowing the electronic device to execute methods based on embodiments disclosed herein.

The program (i.e., the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may have access to a device for performing an embodiment of the disclosure via an external port. In addition, or alternatively, an additional storage device on a communication network may have access to the device.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form may also be expressed in a singular form, or vice versa.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description thereof but by the appended claims, and all differences within equivalents of the scope will be construed as being included in the disclosure.

What is claimed is:

1. A method performed by an electronic device comprising a power amplifier, the power amplifier comprising a first power amplifier, a second power amplifier, and a transmission line, the method comprising:

obtaining, by at least one sensor, a first voltage of a first signal outputted by the first power amplifier at a first point of a first connection member connecting the first power amplifier and a first end of the transmission line;

obtaining, by the at least one sensor, a second voltage of a second signal outputted by the power amplifier at a second point of a second connection member connecting a second end of the transmission line and an antenna, wherein the second power amplifier is electrically connected to the second connection member; and calculating a power of the second signal, based on the first voltage and the second voltage, wherein a length of the transmission line is based on a wavelength of the second signal.

2. The method of claim 1, wherein the length of the transmission line is substantially a quarter of the wavelength of the second signal.

3. The method of claim 1, wherein the power amplifier is a Doherty power amplifier, wherein the first power amplifier is a main power amplifier, wherein the second power amplifier is a peak power amplifier, wherein the transmission line is disposed inside the Doherty power amplifier, and wherein the length of the transmission line is substantially a quarter of the wavelength of the second signal.

4. The method of claim 1, wherein a phase difference between a first phase of the first signal and a second phase of the second signal is about 180°.

5. The method of claim 1, wherein the power is calculated based on an average value of the first voltage and the second voltage.

6. The method of claim 5, wherein the average value is an arithmetic average value of the first voltage and the second voltage.

7. The method of claim 1, wherein the power is calculated based on at least one of a maximum value, a median value, or a weight of each of the first voltage and the second voltage.

8. An electronic device in a wireless communication system, the electronic device comprising:

a power amplifier comprising a transmission line, a first power amplifier, and a second power amplifier;

an antenna;

a first connection member connecting the first power amplifier and a first end of the transmission line;

a second connection member connecting a second end of the transmission line and the antenna, wherein the second power amplifier is electrically connected to the second connection member;

at least one sensor;

at least one processor electrically coupled to the at least one sensor; and memory storing instructions, wherein the instructions, when executed by the at least one processor individually or collectively, cause the electronic device to:

obtain, by the at least one sensor, a first voltage of a first signal outputted by the first power amplifier at a first point of the first connection member;

obtain, by the at least one sensor, a second voltage of a second signal outputted by the power amplifier at a second point of the second connection member, and calculate a power of the second signal, based on the first voltage and the second voltage obtained by the at least one sensor, and wherein a length of the transmission line is based on a wavelength of the second signal.

9. The electronic device of claim 8, wherein the length of the transmission line is substantially a quarter of the wavelength of the second signal.

10. The electronic device of claim 8, wherein the power amplifier is a Doherty power amplifier, wherein the first power amplifier is a main power amplifier, wherein the second power amplifier is a peak power amplifier, wherein the transmission line is disposed inside the Doherty power amplifier, and wherein the length of the transmission line is substantially a quarter of the wavelength of the second signal.

11. The electronic device of claim 8, wherein a phase difference between a first phase of the first signal and a second phase of the second signal is about 180°.

12. The electronic device of claim 8, wherein the instructions, when executed by the at least one processor individually or collectively, cause the electronic device to:

calculate the power based on an average value of the first voltage and the second voltage.

13. The electronic device of claim 12, wherein the average value is an arithmetic average value of the first voltage and the second voltage.

14. The electronic device of claim 8, wherein the instructions, when executed by the at least one processor individually or collectively, cause the electronic device to:

calculate the power based on at least one of a maximum value, a median value, or a weight of each of the first voltage and the second voltage.

15. An electronic device in a wireless communication system, the electronic device comprising:

a plurality of radio frequency (RF) chains;

a plurality of antennas corresponding to the plurality of RF chains;

at least one sensor;

memory storing instructions; and at least one processor electrically coupled to the at least one sensor, wherein at least one RF chain of the plurality of RF chains includes:

a power amplifier comprising a first power amplifier, a second power amplifier, and a transmission line, and a first connection member connecting the first power amplifier and a first end of the transmission line;

a second connection member connecting a second end of the transmission line and an antenna of the plurality of antennas, wherein the second power amplifier is electrically connected to the second connection member, wherein the instructions, when executed by the at least one processor individually or collectively, cause the electronic device to:

obtain, by the at least one sensor, a first voltage of a first signal outputted by the first power amplifier at a first point of the first connection member;

obtain, by the at least one sensor, a second voltage of a second signal outputted by the power amplifier at a second point of the second connection member, and calculate a power of the second signal, based on the first voltage and the second voltage obtained by the at least one sensor, and wherein a length of the transmission line is based on a wavelength of the second signal.

16. The electronic device of claim 15, wherein the length of the transmission line is substantially a quarter of the wavelength of the second signal.

17. The electronic device of claim 15, wherein the power amplifier is a Doherty power amplifier, wherein the first power amplifier is a main power amplifier, wherein the second power amplifier is a peak power amplifier, wherein the transmission line is disposed inside the Doherty power amplifier, and wherein the length of the transmission line is substantially a quarter of the wavelength of the second signal.

18. The electronic device of claim 15, wherein a phase difference between a first phase of the first signal and a second phase of the second signal is about 180°.

19. The electronic device of claim 15, wherein the instructions, when executed by the at least one processor individually or collectively, further cause the electronic device to:

calculate the power based on an arithmetic average value of the first voltage and the second voltage.

20. The electronic device of claim 15, wherein the instructions, when executed by the at least one processor individually or collectively, cause the electronic device to:

calculate the power based on at least one of a maximum value, a median value, or a weight of each of the first voltage and the second voltage.

* * * * *